(12) United States Patent
Bulger

(10) Patent No.: US 6,238,505 B1
(45) Date of Patent: May 29, 2001

(54) PROTRUDING BOLT BUMPER

(76) Inventor: John T. Bulger, 763 Meeker Ave., Brooklyn, NY (US) 11222

(*) Notice: Subject to any disclaimer, the term of this patent is extended or adjusted under 35 U.S.C. 154(b) by 0 days.

(21) Appl. No.: 09/141,159

(22) Filed: Aug. 27, 1998

(51) Int. Cl.[7] .............................. B32B 31/00; F16B 19/00; F16B 33/00
(52) U.S. Cl. ......................... 156/87; 156/60; 411/372.6; 411/377; 411/910
(58) Field of Search .................................. 411/372, 373, 411/377, 431, 910, 907, 908, 372.6, 930; 156/60, 87

(56) References Cited

U.S. PATENT DOCUMENTS 4,826,380 * 5/1989 Henry .................................. 411/377

FOREIGN PATENT DOCUMENTS

3642537 * 6/1988 (DE) ..................................... 411/377

* cited by examiner

*Primary Examiner*—Neill Wilson
(74) *Attorney, Agent, or Firm*—John P. Halvonik

(57) ABSTRACT

The invention is a plastic safety cover for covering bolts and similar hardware items that may extend from construction projects such as building scaffolding. The invention is designed to be used to cover bolts etc. that extend outward from scaffolding found on construction sites urban areas. The cover may use commercially sold plastic caps that are typically in use on many items sold in retail. The cover should have a series of weep holes in order to permit drainage of water from the cover and should have an aperture cut in the top wall in order to accommodate the bolt that may protrude through the upper wall.

1 Claim, 2 Drawing Sheets

PROTRUDING BOLT BUMPER

BACKGROUND OF THE INVENTION

1. Field of the Invention

The invention relates to the field of bolt covers and in particular to a cover made of plastic or similar materials that are softer than metal in order to provide a safe covering for bolts and other hardware that extends from construction projects.

It is observed that in many urban building projects, temporary scaffolding is erected near the street, typically on the sidewalk and the exposed hardware poses a danger to passers by that may cut themselves or their clothing on the hardware. Such pieces such as metal bolts and nuts that secure the scaffolding are typically used on such construction projects. Such members pose a danger to passers by as arms or body may get caught on the bolts causing damage to the skin or clothing. Because of this it is necessary to cover any such hardware up to five or six feet from ground level as this is the height of people who may be injured by the bolts.

It is believed that by covering such hardware pieces with a soft covering as described herein this will protect passers by from the dangers of such hardware. Any construction project that uses such hardware may find use for the invention.

2. Description of the Prior Art

While there are bolt covers in the prior art, none of them use readily available coverings that are found on containers. Nor do they have apertures to accommodate the bolts so as to allow the bolts to protrude through the top of the cap. Moreover, none of the prior art coverings are known to be directed to the idea of covering the bolts in order to make them safe for passersby. Other prior art methods that are used to cover such hardware include duct tape and similar materials. Such coverings may be used on an ad hoc basis in order to cover bolts and nuts. This is assuming that the construction workers bother to go to the trouble of covering the bolts with such.

There are several disadvantages to using tape. Tape can be expensive and is certain to be more time consuming than the cap described herein. Wrapping such tape over and around the bolt is bound to take more time than using the cap described herein. Another time factor involves the dismantling of such projects because such tape may have to be cut with shears when the project is over and the scaffold needs to be dismantled. Using the cap will eliminate time involved in both placing the coverings and dismantling when the project is over. The cost of the cap should be as expensive or perhaps less expensive than the duct tape method. Using caps that have already been sold in the retail business will also help to decrease the cost of the covering.

SUMMARY OF THE INVENTION

The invention is a plastic safety cover for covering bolts and similar hardware items that may extend from construction projects such as building scaffolding. The invention may be made by recycling already existing plastic caps or small bottles found in the retail sales and making minor modifications to them. The invention comprises a cylindrical shaped plastic member having an upper wall in order to close off one side of the cylinder. The cap is designed to be used to cover bolts etc. that extend outward from buildings. The upper wall should have an aperture cut or otherwise created in order to accommodate the bolt that may protrude through this wall. The cover should have a series of weep holes in order to permit drainage of water from the cover due to precipitation.

It is an object of the invention to provide a safe covering for bolts and other hardware that would otherwise pose a danger for pedestrians who pass by scaffolding used on urban construction sites.

Another objective is to provide a safe covering for hard ware such as bolts and nuts that can be use by retooling readily available plastic covers sold as part of retail products.

Another objective is provide safety covers for bolts and other hardware that can be easily and inexpensively made from existing plastic materials that are readily available.

Another objective is to provide a safe covering for hardware such as bolts and nuts that can be quickly and more easily applied to the hardware than existing covering methods, such as covering with duct tape.

Another objective is to provide a covering to protect underwater structures such as scaffolding and the like that have metal hardware such as bolts and nuts that would otherwise be subject to corrosion and other deteriorative effects.

Other advantages of the invention should be readily apparent to those skilled in the art once the invention has been described.

DESCRIPTION OF THE PREFERRED EMBODIMENT

Figure 1:
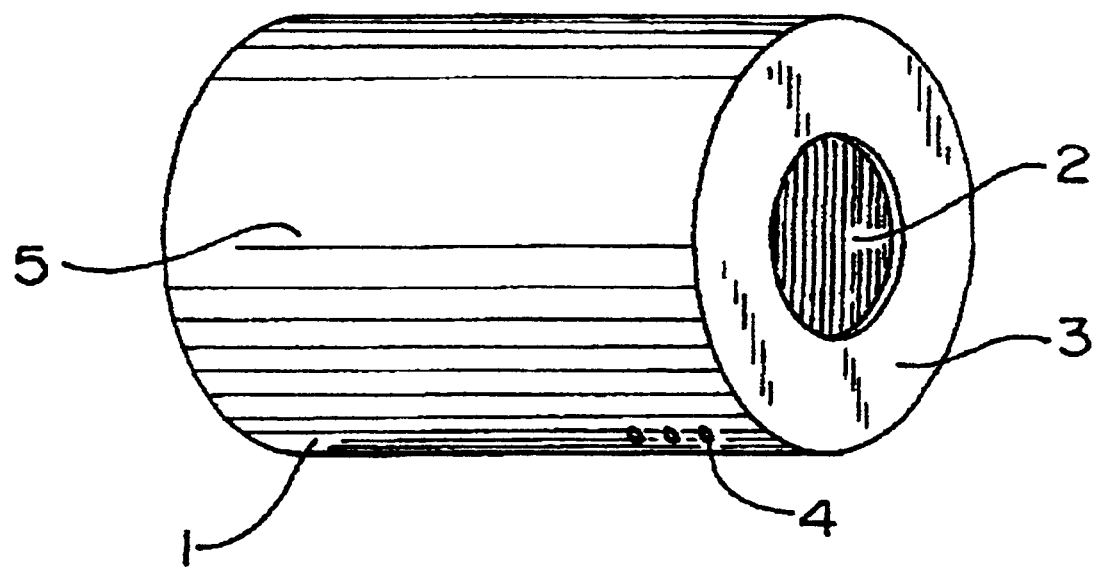
FIG. 1 depicts a side view of the bolt bumper before installation.
Figure 2:
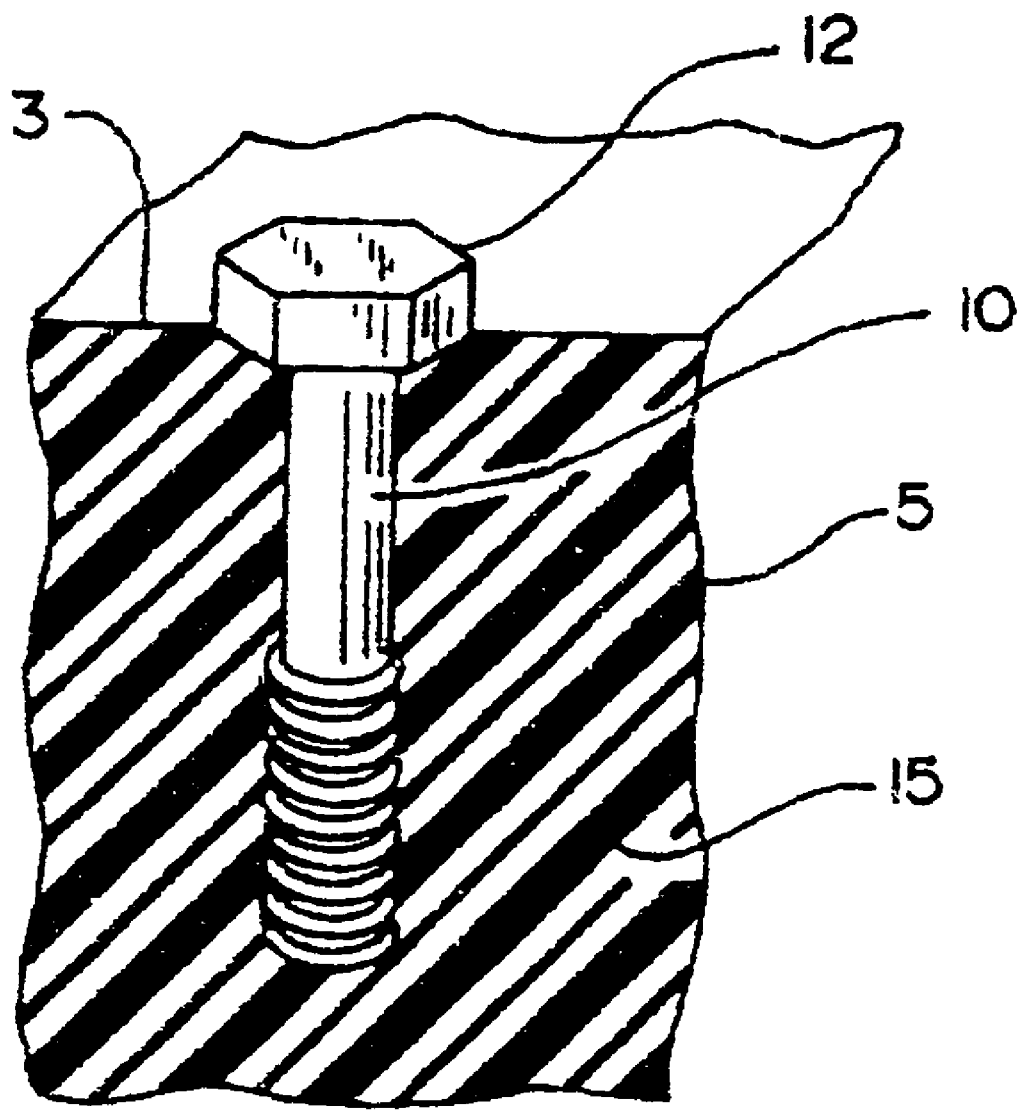
FIG. 2 depicts cut away view of bolt bumper and bolt in use with water resistant material.

The overall construction of the apparatus is shown in FIG. 1. There is an outer wall 5 that is curved so as to form a cylindrical shape. A top wall 3 is in connection with the outer wall and serves to close off one end of the cylindrical shape. The main aperture 2 is cut in the top wall and should be sized and shaped to accommodate a bolt head see bolt 10 and head 12 in FIG. 2. that may be protrude up through this aperture. This aperture is thought necessary as there are some large bolts in use nowadays that are of larger height than the cap.

The covers may be readily made by reconditioning plastic caps already found in the common use. Such covers are typically used to cover retail packaging that has projections such as nozzles at the top e.g. aerosol type dispensers, etc. The covers may be fashioned by cutting an aperture 2 at the top of the cover for the egress of the bolt head that would normally be exposed to passers by at the construction site. The apertures should be sized and shaped to accommodate state of the art bolts that may be found on such sites. Alternately, the invention could be made by injection molding techniques.

In addition, to the upper aperture, a series of weep holes 4 should also be made in the cap in order to provide means for draining the cap in the event of rain and other precipitation. Preferably three weep holes are preferred but the invention can be practiced with more or less holes. The cover may be rotated when in use, so that the weep face downward and that water will drain through them due to the force of gravity. The weep holes should be near the upper part of the side wall, the part closest to the bolt hole so that water can drain the length of the cover.

It is believed that the cover will find its best usage when used on the lower reaches of scaffolding posts and braces as these parts are most likely to be tampered with by vandals because they are closer to the ground and more easy to reach. Other parts of scaffolding may also find use with the invention. Use of the device is likely to deter vandalism at a construction site as it is believed that a 3" deep socket wrench would be needed to remove a bolt covered by this device.

The bolt cover may be painted in a bright color e.g. orange or yellow or some other color in order to warn passersby that there is a protruding structure that might injure them as they walk by. Workers on the scaffolding may also identify the cover by its color and they can grasp the cover and pull lightly on it to make sure that it is still functioning.

In addition, to protecting passersby the cover may also find use in preventing vandals from stealing or damaging the scaffold structure by removing bolts. The cover will prevent easy access to such nuts and bolts that may otherwise be exposed to vandals. In addition such cover may be filled with wax or e.g. sealing wax in order to protect the hardware from deterioration due to dampness etc.

The cover may also be filled with styrofoam insulation that may be added by use of a caulking gun or similar apparatus. In that event, the cover would have to be chopped if a vandal wanted to access the bolt beneath. The use of a water resistant or water proof material like styrofoam or wax, etc. will also prevent rusting of the bolt threads.

The invention may also be used as a part of a method to protect underwater structures such as scaffolding and the like from the deterioration that would otherwise occur to metal hardware such as bolts that connect the scaffold. Such method would involve covering the scaffold bolts in the same way as described above with the additional step of pouring molten wax see 15 in FIG. 2 or some other sealing member into the hole. The shape of the cover would provide the form for the mold and the cover can be left in place once the wax has dried. The scaffolding can then be used underwater and the bolt will not rust or otherwise deteriorate from the effects of the water and/or possibly salt water. The use of the bolt protector could thereby hold a water resistant material and thereby protect hardware such as bolts in underwater applications.

Such underwater applications may include scaffolding used to support motors and pumps that are used underwater.

While the innovation is primarily intended to cover bolts and nuts found on scaffolding the device is not limited to such uses. Other projects that also use nuts and bolts may find use for the invention. The invention is not limited to one particular size but may be varied. Stanchions used to support radio antennas, lighting and power lines may also find use for the invention among others.

It is intended that the caps or covers be made of plastic as these sorts of caps are already in retail circulation. Other materials may be used for the cover without varying from the spirit of the invention.

What is claimed is:

1. A method of protecting bolts that are in connection with support structures, said method comprising the steps of:
    a) covering the bolt with an apparatus comprising: a plastic cap having a round wall so as to form a cylindrical shaped cavity within said wall, said cap having a top portion in connection with said round wall, said top portion having an aperture of size and shape to permit the egress of the bolt, said round wall having a series of weep holes sufficient to permit the drainage of moisture from said cavity; and,
    b) pouring a molten material that is resistant to water into said aperture in said cover and allowing said molten material to harden.

* * * * *